Patented Mar. 29, 1927.

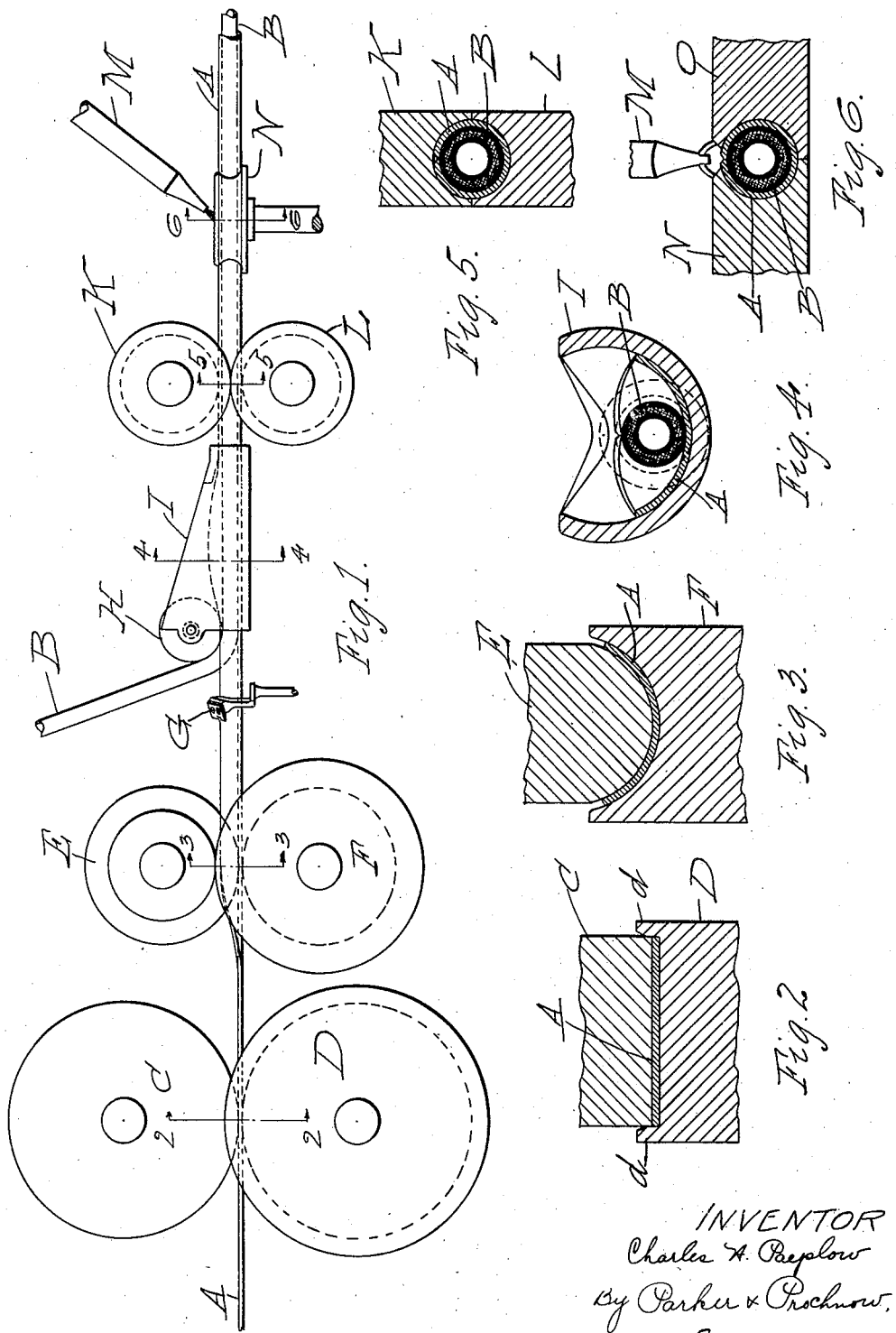

1,622,340

UNITED STATES PATENT OFFICE.

CHARLES H. PAEPLOW, OF BUFFALO, NEW YORK.

PROCESS OF CURING RUBBER HOSE AND THE LIKE.

Application filed February 17, 1926. Serial No. 88,837.

This invention relates to processes for curing rubber hose or tubing while the same is subjected to internal air pressure.

The objects of this invention are to provide a method of this kind in accordance with which the hose to be vulcanized or cured is first encased in a sheath of lead or analogous metal, after which the hose within the sheath of lead may be subjected to internal air pressure, and vulcanized while subjected to said pressure; also to provide a process of this kind wherein the interior of the sheath of metal may be provided with any suitable design or lettering, which will be reproduced on the outside of the hose; also to provide a process of this kind for securing a sheet of lead around the hose so that the exterior of the hose may be of uniform diameter; also to provide a process of this kind whereby the hose can be made in long lengths and whereby the cost of production of hose of this kind can be reduced; also to improve processes of this kind in other respects hereinafter specified.

In the accompanying drawings,

Fig. 1 is a diagrammatic view of an apparatus for carrying out my improved process.

Figs. 2, 3, 4, 5 and 6 are respectively, fragmentary, transverse, sections thereof on lines 2—2, 3—3, 4—4, 5—5 and 6—6, respectively of Fig. 1.

It is well known that in the manufacture of hose made of rubber and fabric, or of rubber only, it is very desirable that the hose should be vulcanized while subjected to internal pressure and while the outer walls thereof are confined so as to produce a hose of uniform outside and inside diameters, and so that the material of the hose is under compression while being vulcanized, to produce a strong and durable hose. In accordance with processes heretofore commonly used, however, the hose could only be so made in comparatively short lengths.

In accordance with my improved process a sheath of lead or other suitable metal or alloy is formed around the hose after the fabric and raw rubber of the hose have been assembled in the usual manner. This metal sheath may be of any desired length so that there is practically no limit to the length of hose which can be treated at one time. This sheath of metal is preferably formed from a strip of metal by forming or bending the strip around the uncured hose, for example by means of forming rolls or dies through which the strip and hose are drawn, and the opposite meeting edges of the strip may be welded, soldered or burned together or they may be held together by means of a tape or cord wound around the metal sheath. After the metal sheath has been securely fastened around the hose, one end of the hose is closed while the other end is connected with a supply of compressed air so that all of the hose is subjected to internal air pressure which causes the rubber and fabric to expand outwardly and into contact with the sheath. The sheath is then immersed in a bath of hot liquid so that the vulcanizing or curing of the rubber takes place while the hose is subjected to internal air pressure and while the material in the hose is compressed against the inner wall of the sheath. After the curing is completed the metal sheath may be cut or stripped from the hose and may be either straightened or remelted and used over again.

The accompanying drawing shows one form of machine or apparatus which may be used for forming a sheath of lead or other metal around a hose in connection with the carrying out of my process. A represents the sheet or strip of lead or other suitable metal and B the hose or tube to be cured or vulcanized. The lead sheet or strip which is made approximately of the correct width and thickness is first preferably subjected to the action of a pair of forming rolls C and D, the upper roller C of which may be provided on its periphery with any suitable design to be formed on the upper face of the strip of lead, which afterwards becomes the exterior of the lead sheath. The design on this face of the lead sheet becomes formed on the exterior of the hose during the vulcanizing thereof. One of the forming rolls, for example, the lower one D is also provided with flanges $d$ between which the lead strip A and the other roller C enter to definitely determine the width of the strip. The thickness of the strip is controlled by the space between the peripheries of the rolls C and D.

After the strip of lead has been discharged from the forming rolls C and D it passes through a pair of shaping rolls E and F of any suitable or usual construction which bend the sheet of lead into a curved or trough shaped form, the peripheries of the two rolls being shaped in accordance with the curvature which it is desired to give to the strip of lead. After the lead leaves the shaping rolls E and F, it may, if desired, be acted upon by a skiver or knife G, or a pair of skivers or knives which are adapted to bevel portions of the opposite edges of the strip of lead. If desired, the skivers or knives G may be omitted.

After the sheet of lead has been formed approximately to the curvature shown in Fig. 3, the hose or tube B of uncured rubber may be placed into the curved sheet or strip of lead in any suitable or desired manner, for example, the hose or tube B may pass from a forming machine or from a reel over a guide roller H and the sheet of lead with the hose or tube positioned therein passes to a forming die I of any suitable or usual construction which bends or forms the strip of lead completely around the tube or hose. The tube after leaving the forming die may, if desired, be passed between another pair of forming rolls K and L, the peripheries of which are provided with semicircular grooves for correctly forming the lead strip around the hose or tube. These forming rolls, however, may be omitted, if desired.

In accordance with the next step of my process, the adjacent or meeting edges of the tubular strip of lead may be secured together in such a manner that there will be no tendency of this strip to open along its longitudinal joint, and this may be done in any suitable or desired manner. In the construction illustrated in Figs. 1 and 6, the longitudinal joint is subjected to a flame from a burner M which burns the lead in the vicinity of the joint and causes the same to weld or flow together to form a substantially unitary sheath around the tube or hose. Preferably the burning, welding or soldering of the joint by means of the flame from the burner M takes place while the tube is held between an adjacent pair of rolls N and O which hold the meeting edges of the strip together while the same is being burned or welded together. The pair of rolls N and O and K and L may also serve to draw the strip of metal and the hose through the forming or bending die I, or other means may be employed for this purpose if desired.

In place of the burning, welding or soldering of the seam, the seam may be left unsoldered and a tape of cotton or other material may be wound around the tube by means of the usual winding mechanism (not shown) which will securely hold the adjacent edges of the sheath together.

The tube or hose with the sheath of lead formed around the same may then be wound upon a reel or drum in the usual manner, and the hose is then filled with air under pressure so that all portions of the hose will be expanded and the walls thereof compressed against the sheath of lead. The reel with the hose wound thereon may be immersed in a bath of hot liquid, the temperature of which is sufficient to cause a vulcanizing or curing of the rubber.

After the tube or hose has been vulcanized or cured, the lead sheath can be removed therefrom in any suitable or desired manner, for example, by stripping the lead therefrom after cutting a longitudinal slit therein, or in case the lead is taped, the tape can be cut and the lead bent back to permit the hose to be removed therefrom. The lead can then either again be formed while cold into a strip for use in connection with another hose or tube, or can be remelted and then formed into a strip, so that the same lead may be used repeatedly.

Instead of using lead to form a sheath around the tube or hose, it will be understood that any other metal or alloy may be used in place of lead without departing from this invention, lead being satisfactory because of its ductility, which makes it possible to wind the hose with the sheath formed around the same on a drum or reel. The apparatus disclosed in the drawings and described is used only for purposes of illustration, and it will be understood that apparatus of any other kind for forming a strip of metal into a sheath around a hose or tube may be employed in connection with my process.

The process described has the advantages that the external diameter of the hose can be controlled with great accuracy by forming the strip of exact thickness and width. Consequently, by making the walls of the hose of uniform thickness, the internal diameter of the hose can also be made uniform throughout its length which decreases greatly the resistance of the hose to the flow of fluids therethrough. By means of my process, the interior of the hose is smooth and practically truly cylindrical, since the internal pressure straightens out all wrinkles or roughness that would otherwise appear on the inner face of the hose and which would greatly increase the resistance to the flow of fluids therethrough. The process has the further advantage that the face of the metal strip which forms the inner face of the metal sheath can be formed with any desired design thereon. The forming of the sheath of metal around the hose can be done at a comparatively high rate of speed, thereby making it possible to manufacture hose of this kind at a moderate cost. Furthermore, the hose can be made of any desired length.

I claim as my invention:—

1. The process of curing tubing or the like containing rubber, consisting of bending a sheet of metal in solid form around the tubing to determine the outside diameter thereof, subjecting the interior of the tubing to pressure and vulcanizing the rubber of said tubing while the same is pressed by interior pressure against said metal.

2. The process of curing tubing or the like containing rubber, consisting of forming a flat strip of metal in solid form around the tubing to form a sheath within which said tubing is confined, subjecting said tubing to interior pressure to press the material of the tubing against said sheath, and vulcanizing the rubber of said tubing while the same is subjected to pressure.

3. The process of curing hose or the like containing rubber, consisting of forming a flat strip of metal in solid form around a hose to form a sheath within which said hose is confined, the opposite edges of the strip of metal forming a joint lengthwise of the hose, holding said opposite edges together to prevent opening of said joint, subjecting the interior of said hose to pressure, and vulcanizing said hose while under pressure.

4. The process of curing hose or the like containing rubber, consisting of forming a strip of metal in solid form to a predetermined width and thickness, bending said strip in the direction of its length around the hose to cause the opposite edges of the strip to meet in a longitudinal joint, holding the meeting edges of said strip together, subjecting the interior of the hose to fluid pressure to compress the walls thereof against said metal strip, and vulcanizing the rubber in said hose while the same is subjected to internal pressure.

5. The process of curing hose or the like containing rubber, consisting of shaping a strip of metal in solid form into cylindrical shape to form a sheath around the hose, securing the edges of the strip together to hold said sheath in cylindrical form when subjected to internal pressure, subjecting the hose in said sheath to internal pressure, and vulcanizing the rubber of the hose while the hose is pressed by the internal pressure against said metal sheath.

6. The process of curing hose or the like containing rubber, consisting of forming a strip of metal into predetermined width and thickness, forming said strip into trough shape, placing the hose into the trough shaped metal, bending said metal around the hose to cause the edges of the metal to meet in a longitudinal joint, holding said meeting edges of the metal strip together to prevent opening of said joint, subjecting said hose within said metal to internal pressure to compress the walls of said hose against said metal, vulcanizing the rubber in said hose while the same is so compressed, and removing the metal from the hose after the completion of the vulcanizing operation.

7. The process of curing hose or the like containing rubber, consisting of making a strip of metal of uniform width and thickness, forming a design on one face of said strip of metal, bending said strip of metal around a hose so that the face of said strip bearing the design is in contact with the hose, holding the meeting edges of said metal in engagement to prevent bending of said metal to open the joint between the edges of the strip of metal, subjecting the interior of the hose to pressure to press the same against the wall of the metal sheath formed by said metal strip, vulcanizing the rubber in said hose while the same is subjected to pressure, and removing the metal strip after the vulcanization.

8. The process of curing hose or the like containing rubber, consisting of making a strip of metal of uniform width and thickness, forming a design on one face of said strip of metal, bending said strip of metal around a hose so that the face of said strip bearing the design is in contact with the hose, forming a seam at the edges of the metal to prevent the separation of the edges, subjecting the hose to internal pressure, vulcanizing the rubber in said hose while the same is subjected to pressure, and removing the metal from the hose after the vulcanization.

9. The process of curing hose or the like containing rubber, consisting of forming a strip of metal to a predetermined width and thickness, bending said strip in the direction of its length around the hose to cause the opposite edges of the strip to meet in a longitudinal joint, holding the meeting edges of said strip together, winding said metal covered hose on a reel, subjecting the interior of the hose to fluid pressure to compress the walls thereof against said metal strip, vulcanizing the rubber in said hose while the same is subjected to internal pressure by immersing said reel in a hot liquid, and removing said metal sheath after the vulcanization is completed.

10. The process of curing hose or the like containing rubber, consisting of forming a strip of lead in solid form to a predetermined width and thickness, bringing the uncured hose and strip of lead together, shaping the uncured hose and strip of lead to forming means which form the strip of lead into cylindrical shape around said hose and which bring the edges of the strip of lead into contact to form a joint extending longitudinally of the hose, securing the strip of lead in its cylindrical form to prevent separation of the edges thereof at the joint, winding the hose with the lead strip secured around the same on a reel, subjecting the interior of the hose to fluid pressure to press the walls of the hose against said cylindrical lead strip, immersing said hose in a vulcanizing medium to cure the rubber in said hose while subjected to pressure, and removing the lead strip from the cured hose.

CHARLES H. PAEPLOW.